(12) United States Patent
Takeshita et al.

(10) Patent No.: US 8,439,250 B2
(45) Date of Patent: May 14, 2013

(54) FRICTION-STIR WELD-TOOL AND METHOD

(75) Inventors: Riki P. Takeshita, Huntsville, AL (US); Randy J. Brown, Slidell, LA (US); Michael R. Eller, New Orleans, LA (US); Duy N. Pham, Marrero, LA (US)

(73) Assignee: Lockheed Martin Corporation, Bethesda, MD (US)

( * ) Notice: Subject to any disclaimer, the term of this patent is extended or adjusted under 35 U.S.C. 154(b) by 10 days.

(21) Appl. No.: 12/828,733

(22) Filed: Jul. 1, 2010

(65) Prior Publication Data

US 2011/0000952 A1 Jan. 6, 2011

Related U.S. Application Data

(60) Provisional application No. 61/222,438, filed on Jul. 1, 2009.

(51) Int. Cl.
*B23K 20/12* (2006.01)

(52) U.S. Cl.
USPC .......................................... 228/112.1; 228/2.1

(58) Field of Classification Search ............... 228/112.1, 228/2.1
See application file for complete search history.

(56) References Cited

U.S. PATENT DOCUMENTS

| 4,070,044 | A | * | 1/1978 | Carrow | 285/133.11 |
| 4,290,543 | A | * | 9/1981 | Larson | 228/2.5 |
| 5,862,975 | A | * | 1/1999 | Childress | 228/120 |
| 2005/0045694 | A1 | * | 3/2005 | Subramanian et al. | 228/112.1 |
| 2009/0159643 | A1 | | 6/2009 | Wimmer et al. | |

FOREIGN PATENT DOCUMENTS

JP 57004392 A * 1/1982

* cited by examiner

*Primary Examiner* — Maria Veronica Ewald
*Assistant Examiner* — Megha Mehta
(74) *Attorney, Agent, or Firm* — Kaplan Breyer Schwarz & Ottesen, LLP

(57) ABSTRACT

A method for joining a tube and tube plate for use in a tube-and-shell heat exchanger is disclosed. The method enables a joint between the tube and tube plate that is substantially hermetic and substantially corrosion-resistant. The method comprises providing an anvil inside the tube, wherein the anvil supports the tube wall during a friction-stir welding process used to join the tube and tube plate. The anvil facilitates formation of a reliable weld region and enables faster friction-stir welding.

19 Claims, 10 Drawing Sheets

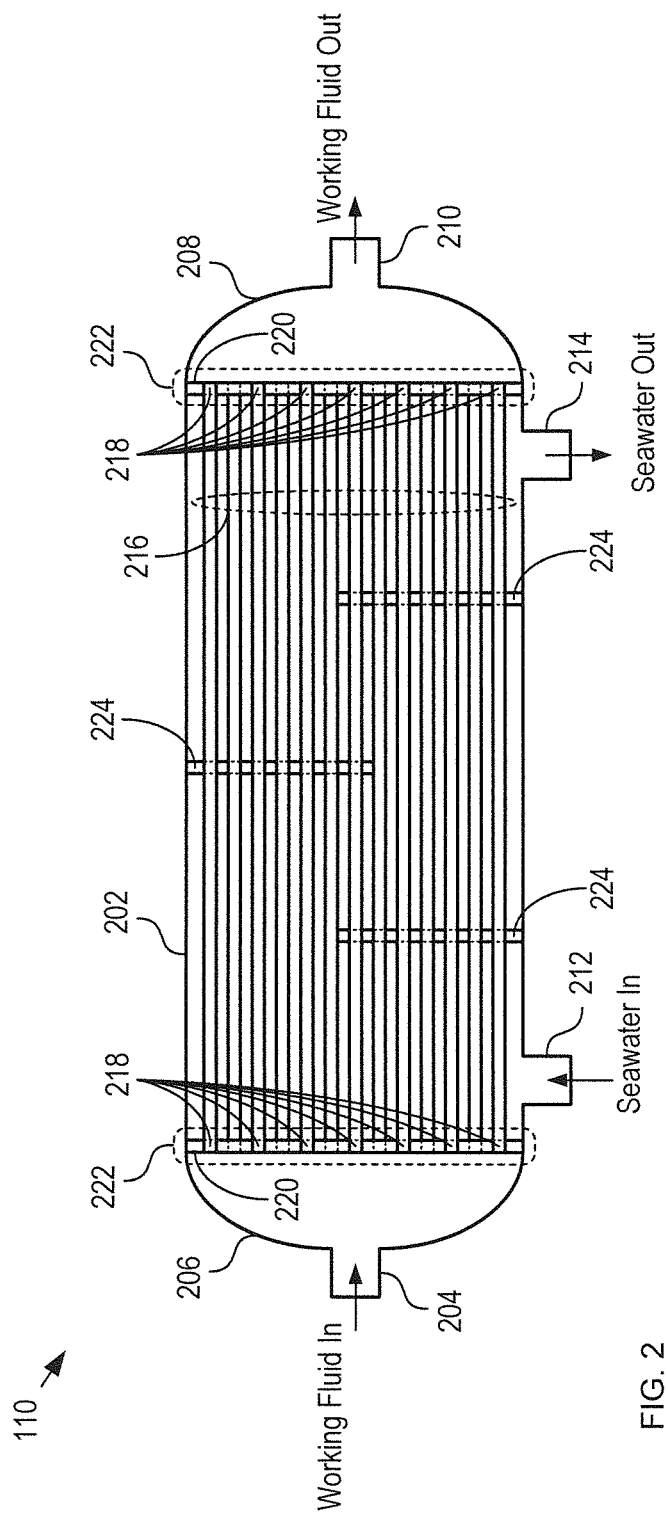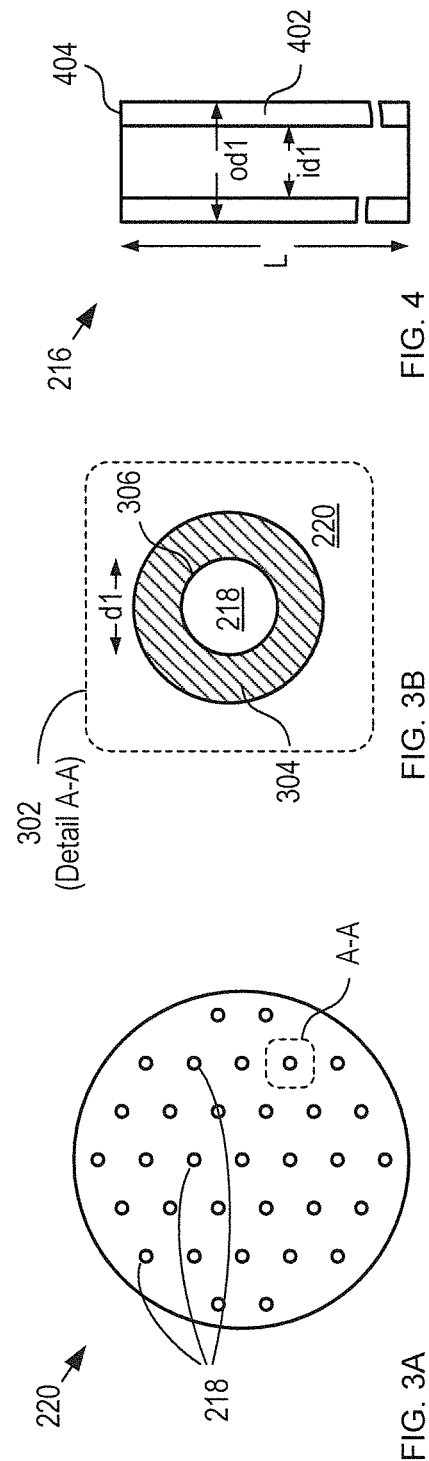

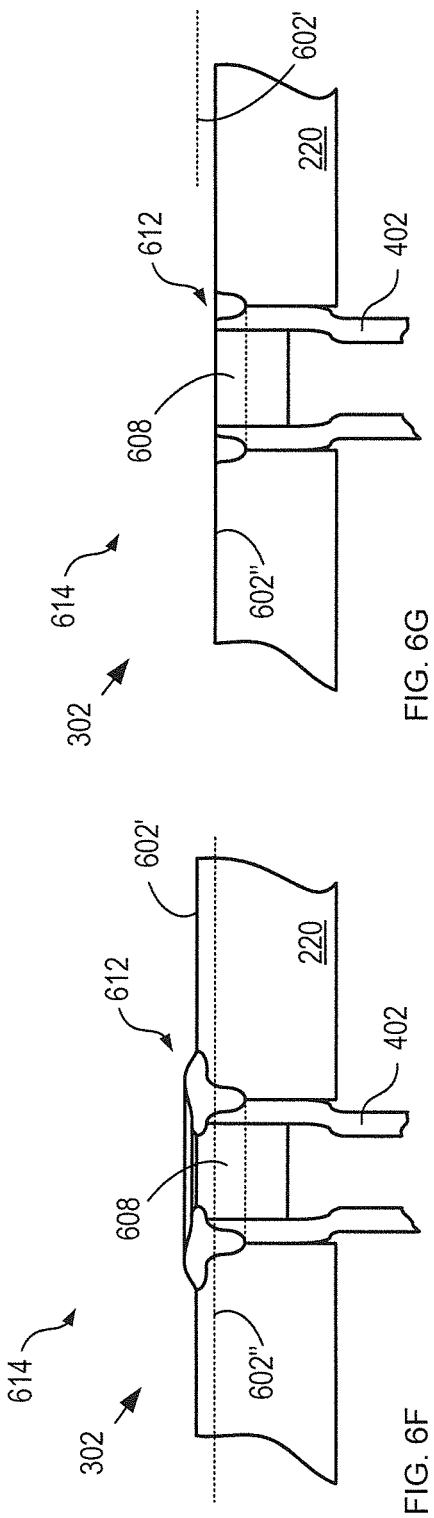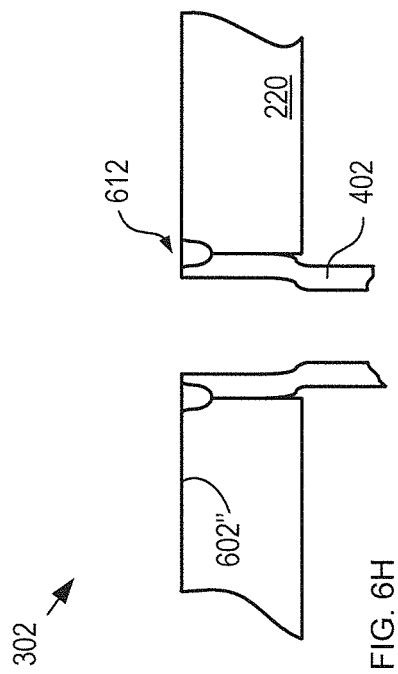

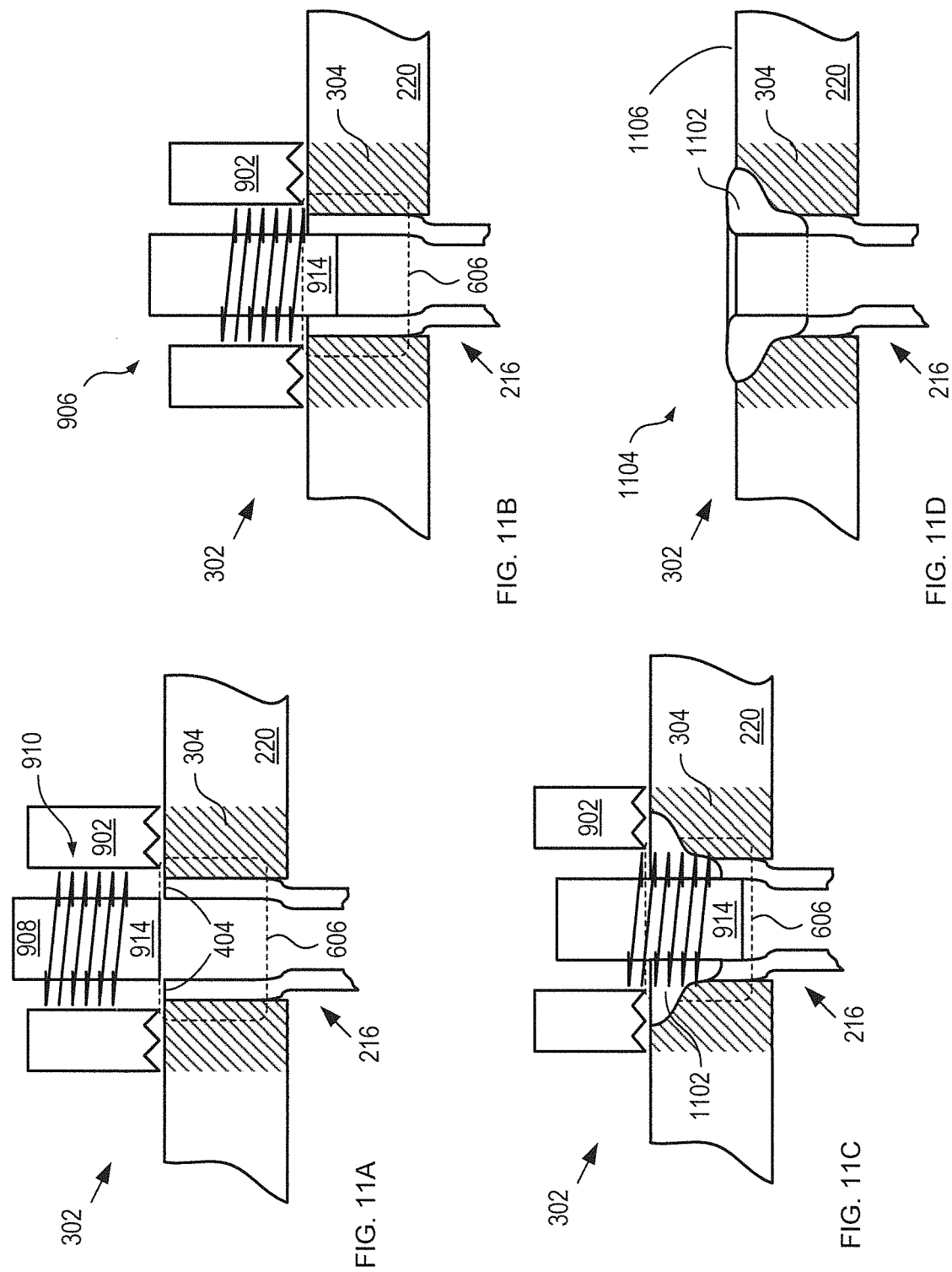

FRICTION-STIR WELD-TOOL AND METHOD

CROSS REFERENCE TO RELATED APPLICATIONS

This case claims priority of U.S. Provisional Patent Application Ser. No. 61/222,438, which was filed Jul. 1, 2009, and which is incorporated herein by reference.

If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to tube-and-shell heat exchangers in general, and, more particularly, to methods for fabricating tube-and-shell heat exchangers.

BACKGROUND OF THE INVENTION

Ocean thermal energy conversion ("OTEC") is a method for generating electricity based on the temperature difference that exists between deep and shallow waters of a large body of water, such as an ocean, sea, gulf, or large, deep lake. An OTEC system utilizes a heat engine (i.e., a thermodynamic device or system that generates electricity based on a temperature differential) that is thermally coupled between relatively warmer shallow and relatively colder deep water.

One heat engine suitable for OTEC is based on the Rankine cycle, which uses a low-pressure turbine. A closed-loop conduit containing a fluid characterized by a low boiling point, such as ammonia, is thermally coupled with warm water at a first heat exchanger where the low-boiling-point fluid is vaporized. The expanding vapor is forced through the turbine, which drives a turbo-generator. After exiting the turbine, the vaporized working fluid is condensed back into a liquid state at a second heat exchanger where the closed-loop conduit is thermally coupled with cold water. The condensed working fluid is then recycled through the system.

OTEC systems have been shown to be technically viable, but the high capital cost of these systems has thwarted commercialization. The heat exchangers are the second largest contributor to OTEC plant capital cost (the largest is the cost of the offshore moored vessel or platform). The optimization of the enormous heat exchangers that are required for an OTEC plant is therefore of great importance and can have a major impact on the economic viability of OTEC technology.

Shell-and-tube heat exchangers have been considered for use in OTEC applications because of their potential for large volume fluid flow and low back pressure. Common industrial shell-and-tube heat exchangers consist of multiple tubes placed between two tube plates and encapsulated in a pressure vessel shell. Fluids or gasses of differing temperatures are passed through the heat exchanger, transferring the heat energy from one medium to the other. The tubes may be press fit or welded into the tube plates.

In many applications (e.g., OTEC, nuclear power generation systems, and chemical plants), separation of the liquids or gasses is critical. As a result, the tubes must be welded in place, typically using fusion welding, and checked for leaks prior to entering service.

The process of welding the heat exchanger tubes has many drawbacks including: (1) high labor costs to prepare and weld all of the tube joints via manual fusion welding techniques, (2) defect repair costs due to the complex manual or semi-automatic fusion welding process, and (3) increased corrosion susceptibility due to dissimilar materials included in the fusion-weld. For OTEC systems, in particular, galvanic-corrosion is a major cause of working fluid contamination due to the exposure of the welds to seawater.

Through the mid 80's to the early 90s, aluminum and aluminum alloys were tested in an actual OTEC environment to determine their compatibility with an ocean environment. These instrumented and remotely monitored tests correlated heat-transfer performance and seawater chemical and physical properties with corrosion in the heat exchangers. As a result of this extended testing, it was concluded that several relatively inexpensive aluminum alloys should survive well in an OTEC application.

The form factor for the heat exchangers being tested was mostly shell-and-tube type. Unfortunately, it was concluded that fabricating shell-and-tube heat exchangers of sufficient surface area out of aluminum would be prohibitively expensive. "Roll bond" heat exchanger panels were proposed as an alternative, which provide the larger surface areas required for OTEC applications at roughly twenty percent the cost of equivalent shell-and-tube units. Corrosion and biofouling issues, however, continue to plague heat exchanges based on roll-bond panels.

In 1989, roll-bond panels were inserted into some the heat exchangers that were being tested in the OTEC environment. This testing led to the development of roll-bond type heat exchanger panels that were actually installed in a 50 kW plant built in 1996. During the first year of testing, serious ammonia leaks were experienced due to corrosion. The corrosion was due to electrolysis, which was caused by the spacer material between the aluminum panels.

By the mid-1990s, government funding of OTEC had concluded. Remaining hurdles for compact aluminum heat exchangers at that time included concerns over the placement of brazed sections within a heat exchanger core.

With today's growing need for energy, using a renewable constant source is a desirable solution. Currently, OTEC power plants having power generation capability of up to 100 MW are being proposed. Such systems, however, will require a very high volume of seawater flow. As a result, many large, high-efficiency heat exchangers will be required and there is a renewed interest in shell-and-tube heat exchangers suitable for use in seawater environments. Unfortunately, development of a shell-and-tube heat exchanger, suitable for OTEC applications, that accommodates high flow rates while minimizing pumping parasitic losses and offering long life in the ocean environment remains elusive.

SUMMARY OF THE INVENTION

The present invention enables formation of a tube sheet comprising tubes that are friction-stir welded to a tube plate without some of the costs and disadvantages of the prior-art. The tubes and tube sheet are joined with weld regions that provide substantially hermetic seals and that are substantially corrosion resistant. Embodiments of the present invention are particularly well suited for use in tube-and-shell heat exchangers used in corrosive-fluid applications such as OTEC, nuclear generator heat exchangers, and chemical plants.

The illustrative embodiment of the present invention comprises a method for joining a tube and tube plate wherein an anvil is located inside the tube during friction-stir welding. The anvil supports the region of the tube being welded to the tube plate during this process.

In some embodiments, the anvil is provided as a plug that is forced into the open end of section of the tube to be welded to the tube plate. During a subsequent welding process, a weld-tool is moved around the circumference of the tube, outside the area of the plug, to plasticize the tube wall and the region of the tube plate that immediately surrounds the tube wall. The plug provides a physical barrier that keeps the plasticized material from flowing out of the weld region.

In some embodiments, the anvil is provided as a pin-portion of the weld-tool itself. The pin-portion has a diameter that is substantially equal to the inner diameter of the tube section to be welded to the tube plate. In some of these embodiments, the anvil does not rotate with respect to the tube. In some embodiments, the anvil does rotate with respect to the tube; however, the anvil does not contribute to the friction-stir weld process itself.

The present invention further provides a weld-tool for friction-stir welding a tube and a tube plate to form a substantially hermetic and corrosion-resistant seal. In some embodiments, the weld-tool comprises a first pin-portion for forming a portion of a weld region and a second pin-portion that functions as an anvil during the friction-stir weld process. During a friction-stir weld operation, the second pin-portion resides further inside the tube than the first pin-portion. The second-pin portion: (1) centers the weld tool; (2) supports the tube wall during friction-stir welding; and (3) blocks access for plasticized material to the interior of the tube. In some embodiments, the second pin-portion is dimensioned and arranged to be non-rotating with respect to the tube. In some embodiments, the second pin-portion rotates with respect to the tube but does not contribute to the friction-stir welding process.

An embodiment of the present invention comprises a method for joining a plate and a tube, the method comprising: inserting the tube into a hole, wherein the plate comprises a first surface, second surface, the hole, and a first region comprising a first material that surrounds the hole, and wherein the tube comprises an end face and a tube wall that comprises a second material; supporting the tube wall, wherein the tube wall is supported by a plug that is located inside the tube; intermingling first material from the first region and second material from the tube wall; and removing the plug.

BRIEF DESCRIPTION OF THE DRAWINGS

FIG. 2 depicts a schematic drawing of a cross-sectional view of a shell-and-tube heat exchanger in accordance with the illustrative embodiment of the present invention.

FIG. 3A depicts a schematic drawing of a top view of a tube plate in accordance with the illustrative embodiment of the present invention.

FIG. 3B depicts a detailed view of a region of tube plate 220, wherein the region comprises a single hole.

FIG. 4 depicts a tube in accordance with the illustrative embodiment of the present invention.

FIGS. 6A-6H depict cross-sectional views of region 302 at different stages of method 500.

FIGS. 11A-F depict a cross-section view of region 302 at different stages of method 1000.

DETAILED DESCRIPTION

Figure 1:
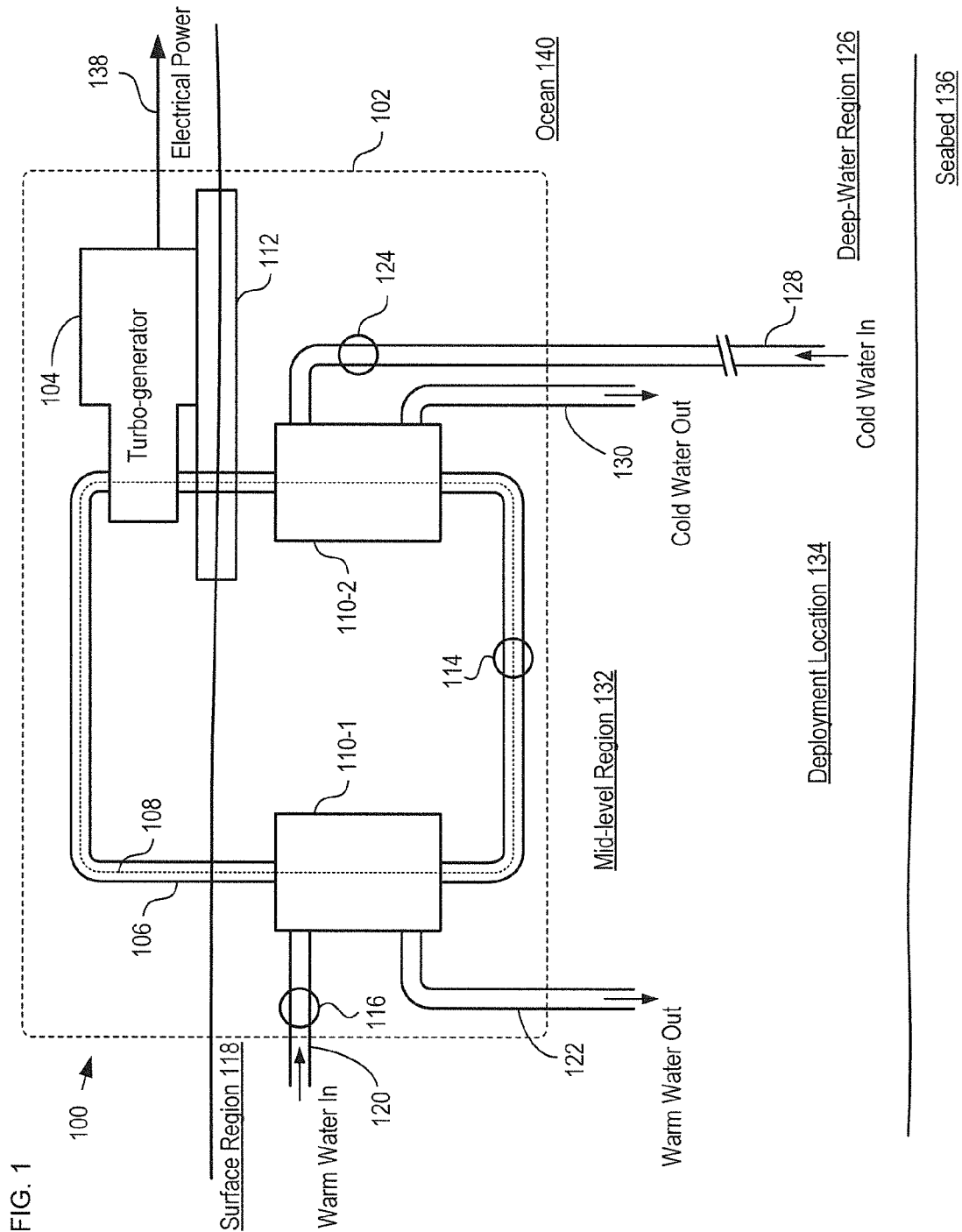
FIG. 1 depicts a schematic diagram of an OTEC power generation system in accordance with an illustrative embodiment of the present invention.

FIG. 1 depicts a schematic diagram of an OTEC power generation system in accordance with an illustrative embodiment of the present invention. OTEC system 100 comprises offshore platform 102, turbogenerator 104, closed-loop conduit 106, evaporator 110-1, condenser 110-2, hull 112, pumps 114, 116, and 124, and conduits 120, 122, 128, and 130.

Offshore platform 102 is a tension leg offshore platform comprising buoyant hull 112, which includes a deck, caissons, and pontoons. The hull is supported above seabed 136 by rigid tension legs that are anchored to seabed 136 at deployment location 134. For clarity, the deck, caisson, pontoons, and tension legs are not shown in FIG. 1.

In some embodiments, offshore platform 102 is deployed at a deployment location in a body of water other than an ocean (e.g., a lake, sea, etc.). In some embodiments, offshore platform 102 is an offshore platform other than a tension leg offshore platform, such as a semi-submersible, spar, drill ship, jack-up offshore platform, grazing plant, and the like. It will be clear to one skilled in the art how to specify, make, and use platform 102.

Turbogenerator 104 is a conventional turbine-driven generator mounted on hull 112. Turbogenerator 104 generates electrical energy in response to a flow of fluid and provides the generated electrical energy on output cable 138.

Closed-loop conduit 106 is a conduit for conveying working fluid 108 through evaporator 110-1, condenser 110-2, and turbogenerator 104.

Evaporator 110-1 is a shell-and-tube heat exchanger that is configured to transfer heat from warm seawater in surface region 118 and working fluid 108 thereby inducing the working fluid to vaporize.

Condenser 110-2 is a shell-and-tube heat exchanger that is configured to transfer heat from vaporized working fluid 108 to cold seawater from deep-water region 126 thereby inducing condensation of vaporized working fluid 108 back into liquid form. Evaporator 110-1 and condenser 110-2 are mechanically and fluidically coupled with offshore platform 102.

One skilled in the art will recognize that the operation of a heat exchanger as evaporator or condenser is dependent upon the manner in which it is fluidically configured within OTEC system 100. A shell-and-tube heat exchanger (i.e., heat exchanger 110) in accordance with the illustrative embodiment of the present invention is described in more detail below and with respect to FIG. 2.

Turbogenerator 104, closed-loop conduit 106, evaporator 110, and condenser 112 collectively form a Rankine-cycle engine that generates electrical energy based on the difference in the temperature of water in surface region 118 and the temperature of water in deep-water region 126.

In typical operation, pump 114 pumps working fluid 108, in liquid form, through closed-loop conduit 106 to evaporator 110-1. Ammonia is often used as working fluid 108 in OTEC systems; however, it will be clear to one skilled in the art that any fluid that evaporates at the temperature of the water in surface region 118 and condenses at the temperature of the water in deep water region 126 is suitable for use as working fluid 108 (subject to material compatibility constraints).

Pump 116 draws warm seawater from surface region 118 into evaporator 110 via conduit 120. In a typical OTEC deployment, the water in surface region 118 is at a substantially constant temperature of approximately 25 degrees centigrade (subject to weather and sunlight conditions). At evaporator 110-1, heat from the warm water is absorbed by working fluid 108, which induces the working fluid to vaporize. After passing through evaporator 110-1, the now slightly cooler water is ejected back into ocean 140 via conduit 122. The output of conduit 122 is typically located deeper in ocean 140 than surface region 118 (i.e., mid-level region 132) to avoid decreasing the average water temperature in the surface-water region.

The expanding working fluid 108 vapor is forced through turbogenerator 104, thereby driving the turbogenerator to generate electrical energy. The generated electrical energy is provided on output cable 138. After passing through turbogenerator 104, the vaporized working fluid enters condenser 110-2.

Pump 124 draws cold seawater from deep water region 126 into condenser 110-2 via conduit 128. Typically deep water region 126 is approximately 1000 meters below the surface of the body of water, at which depth water is at a substantially constant temperature of a few degrees centigrade. The cold water travels through condenser 110-2 where it absorbs heat from the vaporized working fluid. As a result, working fluid 108 condenses back into liquid form. After passing through condenser 110-2, the now slightly warmer water is ejected into ocean 140 via conduit 130. The output of conduit 130 is typically located at a shallower depth in ocean 140 than that of deep-water region 126 (i.e., mid-level region 132) to avoid increasing the average water temperature in the deep-water region.

Pump 114 pumps the condensed working fluid 108 back into evaporator 110-1 where it is again vaporized; thereby continuing the Rankine cycle that drives turbogenerator 104.

FIG. 2 depicts a schematic drawing of a cross-sectional view of a shell-and-tube heat exchanger in accordance with the illustrative embodiment of the present invention. Heat exchanger 110 comprises shell 202, primary fluid inlet 204, input manifold 206, output manifold 208, primary fluid outlet 210, secondary fluid inlet 212, secondary fluid outlet 214, tubes 216, tube plates 220, and baffles 224. Heat exchanger 110 enables efficient heat transfer between a primary fluid that flows through tubes 216 and a secondary fluid that flows through shell 202 such that the secondary fluid flows across the outer surface of each of tubes 216. As discussed above, and with respect to FIG. 1, in the illustrative embodiment, the primary fluid is working fluid 108 and the secondary fluid is seawater. It will be clear to one skilled in the art, after reading this specification, however, that the primary and secondary fluids can selected as any suitable fluid for a given heat exchanger application.

Shell 202 is a housing that comprises a material suitable for long-term exposure to seawater. Shell 202 and tube plates 220 collectively define a flow vessel for conveying seawater from secondary fluid inlet 212 to secondary fluid outlet 214.

Working fluid 108 is conveyed to each of tubes 216 by primary fluid inlet 204 and input manifold 206. In similar fashion, working fluid 108 is collected from each of tubes 216 at output manifold 208 and provided to primary fluid outlet 210. It will be clear to one skilled in the art how to specify, make, and use primary fluid inlet 204, input manifold 206, output manifold 208, and primary fluid outlet 210. Primary fluid inlet 204 and primary fluid outlet 210 are fluidically coupled with closed-circuit conduit 106 such that heat exchanger 110 forms part of the closed-circuit conduit.

Seawater is provided to shell 202 at secondary fluid inlet 212. In evaporator 110-1, secondary fluid inlet 212 is fluidically coupled with conduit 120. In condenser 110-2, secondary fluid inlet 212 is fluidically coupled with conduit 128.

Seawater exits shell 202 through secondary fluid outlet 214. In evaporator 110-1, secondary fluid outlet 214 is fluidically coupled with conduit 122. In condenser 110-2, secondary fluid inlet 214 is fluidically coupled with conduit 130.

It should be noted that, for clarity, FIGS. 1 and 2 depict secondary fluid inlet 212 and secondary fluid outlet 214 on the same side of heat exchanger 110. Typically, however, secondary fluid inlet 212 and secondary fluid outlet 214 are located on opposite sides of heat exchanger 110 to facilitate efficient heat transfer between the primary and secondary fluids.

Each of tubes 216 is a conduit of aluminum alloy having length, inner diameter, and tube wall thickness that are selected for efficient thermal coupling between seawater and working fluid 108. A shell-and-tube heat exchanger suitable for a modern OTEC system will include five to six thousand tubes having a length of up to 30 feet.

Each of tube plates 220 is a mechanically rigid circular plate of aluminum alloy comprising a plurality of holes 218. Each end of tubes 216 is joined to a different one of tube plates 220 at holes 218 to collectively define a tubesheet 222.

Baffles 224 are a conventional transverse baffles that induce a transverse component to the flow of seawater through heat exchanger 110. In some embodiments, baffles 224 also provide support for tubes 216 in the region between tube plates 220. Baffles 224 comprises a plurality of through-holes for tubes 216. The number and placement of baffles 224 is a matter of heat exchanger design and one skilled in the art will recognize that any practical number of baffles 224 can be included in heat exchanger 110.

Tube plates 220 and baffles 224 hold the tubes in an arrangement that facilitates heat transfer between seawater flowing along the outer surfaces of the tubes and working fluid 108 that flows through the tubes.

For many applications, such as OTEC, nuclear heat exchangers, chemical plants, and the like, it is important that heat exchanger 110 provide excellent separation between the primary and secondary fluids. As a result, it is important that tubes 216 are joined with tube plates 220 to form substantially hermetic seals. Further, in many applications, OTEC applications in particular, is also important that these seals are substantially corrosion resistant. It is an aspect of the present invention, therefore, that tubes 216 are joined with tube plates 220 using friction-stir welding in such a manner that tubes 216 and tube plates 220 form seals that are both substantially hermetic and substantially corrosion resistant.

Friction-stir welding is a well-known method for joining two elements of the same material. Conventional friction-stir welding employs a rotating probe that is forced into the interface between the two elements. The immense friction between the probe and materials causes material in the immediate vicinity of the probe to heat up to temperatures below its melting point. This softens the adjoining sections, but because the material remains in a solid state, its original material properties are retained. Movement of the probe along the weld line forces the softened material from the two pieces towards the trailing edge causing the adjacent regions to fuse, thereby forming a weld.

As opposed to other common joining techniques, such as fusion welding, brazing, etc., friction-stir welding has several performance advantages. In particular, the resultant weld is comprised of the same material as the joined sections. As a result, galvanic corrosion due to contact between dissimilar metals at the joint is reduced or eliminated. Furthermore, the resultant weld retains the material properties of the material of the joined sections.

Although in the illustrative embodiment friction-stir welding is typically used to join two elements that are formed of the same material, in some embodiments of the present invention, friction-stir welding is used to weld elements that are formed of dissimilar materials.

Furthermore, although the illustrative embodiment comprises tubes and tube plates that each are made of aluminum alloy, it will be clear to one skilled in the art, after reading this specification, how to specify, make, and use alternative embodiments of the present invention wherein at least one of tubes 216 or tube plates 220 comprises a material other than aluminum alloy. Materials suitable for use in embodiments of the present invention include any material suitable for joining a tube and tube plate using friction-stir welding including, without limitation, aluminum alloys, aluminum, titanium, stainless-steel, bronze, plastics, and the like.

FIG. 3A depicts a schematic drawing of a top view of a tube plate in accordance with the illustrative embodiment of the present invention. Tube plate 220 comprises a plurality of holes 218.

FIG. 3B depicts a detailed view of a region of tube plate 220, wherein the region comprises a single hole. Region 302 (detail A-A) depicts hole 218 formed in tube plate 220 and region 304, which is an annular region of tube plate 220 that immediately surrounds hole 218. Hole 218 comprises sidewall 306, which is also the inner surface of region 304.

FIG. 4 depicts a tube in accordance with the illustrative embodiment of the present invention. Tube 216 comprises tube wall 402 and end face 404. Tube 216 has inner diameter id1, outer diameter, od1, and length, L. L is based on the separation between tube plates 220 in heat exchanger 110.

Figure 5:
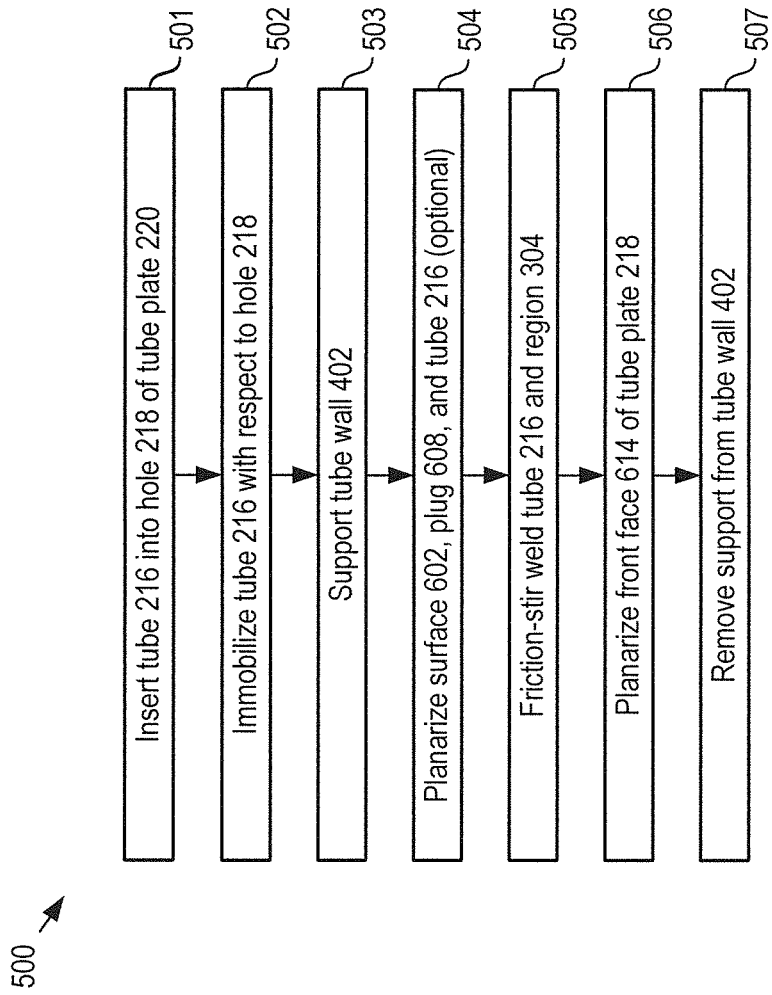
FIG. 5 depicts operations of a method suitable for joining a tube and a tube plate in accordance with the illustrative embodiment of the present invention.

FIG. 5 depicts operations of a method suitable for joining a tube and a tube plate in accordance with the illustrative embodiment of the present invention. Method 500 begins with operation 501, wherein tube 216 is inserted into hole 218 of tube plate 220. Method 500 is described with continuing reference to FIGS. 2-4 and reference to FIGS. 6A-6H.

FIGS. 6A-6H depict cross-sectional views of region 302 at different stages of method 500.

Figure 6D:
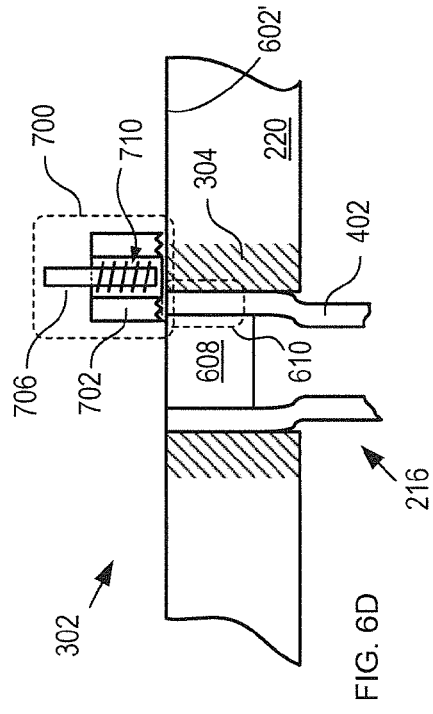
Figure 6E:
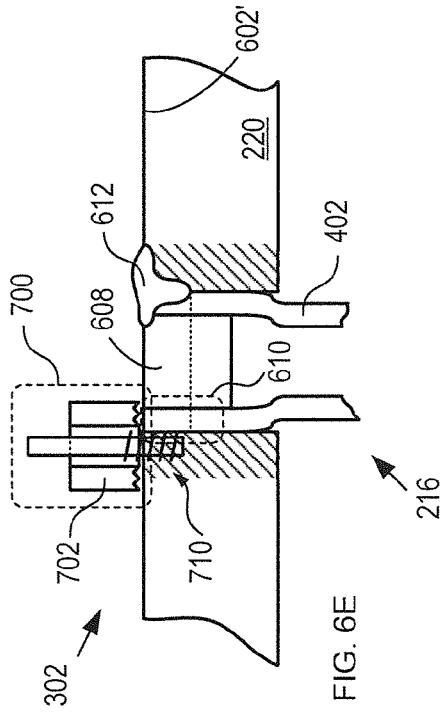
Figure 6A:
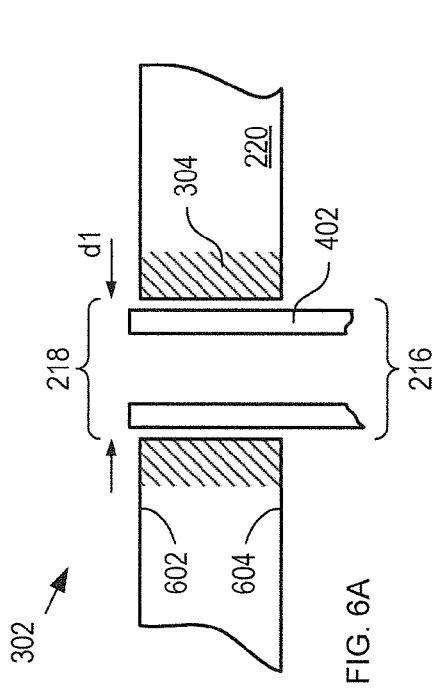

FIG. 6A depicts a schematic drawing of a cross-section view of region 302 after insertion of tube 216 into hole 218. In some embodiments, the outer diameter, od1, of tube 216 is less than the diameter, d1, of hole 218 to facilitate insertion of tube 216 into hole 218.

Hole 218 extends from front surface 602 of tube plate 220 to back surface 604 of tube plate 220. Although it is desirable for tube 216 to be inserted into hole 218 such that end face 404 is flush with front surface 602, commonly tube 216 projects slightly beyond front surface 602 as shown.

At operation 502, tube 216 is immobilized with respect to hole 218 by expanding a portion of tube 216 that resides within hole 218.

Figure 6B:
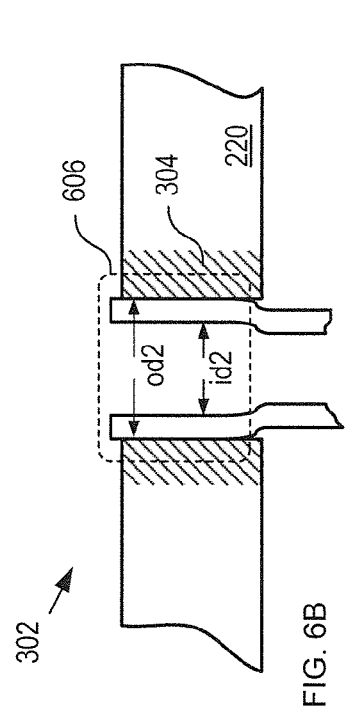

FIG. 6B depicts a cross-section view of region 302 after operation 502. Portion 606 of tube 216 is expanded (e.g., by means of a tube expander) such that its expanded outer diameter, od2, is substantially equal to the diameter, d1, of hole 218. This forces tube wall 402 into contact with sidewall 306 along portion 606. Friction between portion 606 and sidewall 306 substantially captures tube 216 in hole 218.

In some embodiments, tube 216 is immobilized by holding a portion of the tube in a fixture (e.g., a vise, jig, clamp, etc.) that is located outside hole 218 of tube plate 220.

At operation 503, tube wall 402 is mechanically supported by an anvil inserted into the interior of portion 606.

Plug 608 is a cylinder of aluminum alloy that has a diameter that is substantially equal to the inner diameter of portion 606 of tube 216. Plug 608 functions as an anvil that provides reinforcement for the material of sidewall 404 during friction-stir welding. In some embodiments, a portion of plug 608 is incorporated into the weld formed between tube 216 and tube plate 220. In applications wherein galvanic-corrosion resistance is of particular importance, therefore, plug 608 is typical made of the same material as tube 216 and tube plate 220. In some embodiments, plug 608 comprises a material other than aluminum alloy but that has suitable strength and heat resistance to withstand the environment associated with friction-stir welding. In some embodiments, plug 608 has a cross-sectional shape that substantially matches the shape of a tube that is other than a circular tube. For example, in some embodiments, each of tube 216 and plug 608 has a cross-sectional shape other than a circle, such as a square, oval, rectangle, or an irregular shape.

In some embodiments, the sidewall of plug 608 is slightly tapered and has an angle within the range of approximately 0.5 degree to approximately 1.5 degrees. Tapering the sidewall of plug 608 relaxes the dimensional tolerance for the diameter of plug 608.

Although it is desirable for plug 608, end face 404, and surface 602 to be co-planar after plug 608 is inserted into tube 216, often plug 608 will project beyond end face 404. As a result, in some embodiments, it is necessary to treat tube plate 220 to planarize them.

Figure 6C:
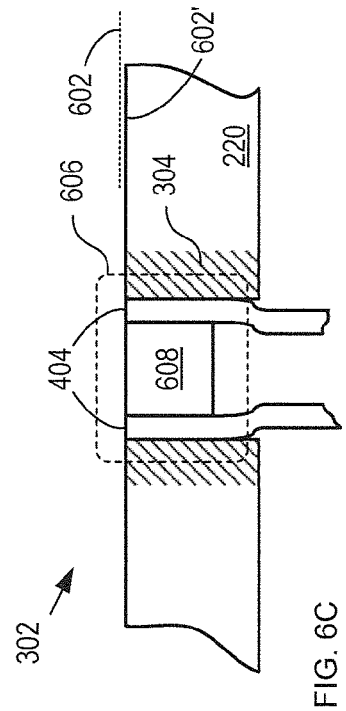

At optional operation 504, plug 608, end face 404, and front surface 602 are planarized by removing those portions of plug 608 and tube 216 that extend beyond surface 602. In some embodiments, a portion of tube plate 220 is also removed (e.g., by machining front surface 602, end face 404, and plug 608 with a fly cutter, etc.) thereby exposing new front surface 602'. FIG. 6C depicts a cross-section view of region 302 after planarization of plug 608, end face 404, and surface 602.

At operation 505, tube wall 402 and region 304 are welded using friction-stir welding. In the illustrative embodiment, weld-tool 700 is used to friction-stir weld tube wall 402 and region 304.

Figure 7:
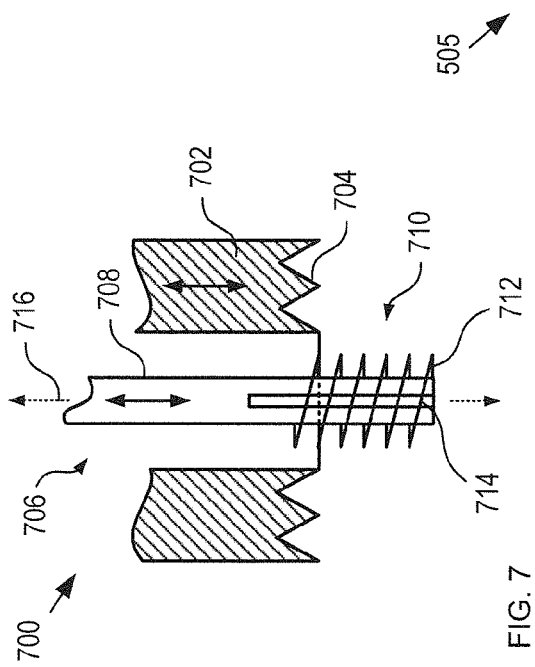
FIG. 7 depicts a schematic drawing of a weld-tool in accordance with the illustrative embodiment of the present invention.

FIG. 7 depicts a schematic drawing of a weld-tool in accordance with the illustrative embodiment of the present invention. Weld-tool 700 comprises shoulder 702 and pin 706. Each of shoulder 702 and pin 706 rotate about axis 716 (i.e., their mutual longitudinal axis). Further, each of shoulder 702 and pin 706 is independently movable along axis 716.

Shoulder 702 is a rotatable disc comprising threads formed in contact surface 704. These threads facilitate friction-induced heating of the regions to be welded. Shoulder 702 comprises a material suitable for withstanding the pressure and heat associated with friction-stir welding of tube 216 and region 304. Shoulder 702 has a diameter approximately equal to the distance from the inside surface of expanded tube wall 402 to the extent of region 304. Typically, shoulder 702 is sized to avoid forming an unnecessarily large weld region so as to enable highly dense arrangements of tubes 216.

Pin 706 comprises pin-portion 708 and pin-portion 710. Pin-portion 708 is a shank suitable for coupling to a drive system for rotating pin 706. Pin-portion 710 comprises features 712. Features 712 facilitate mass transport of material from the regions to be welded along a direction aligned with axis 716. Features 712 also facilitate the intermingling of these materials. Pin 706 is sized to avoid significant incorporation of the material of plug 608 during the formation of a weld-region.

In some embodiments, pin-portion 710 further comprises one or more slots 714 for aiding removal of pin 706 from a conjoined region (i.e., a region in which the materials of the regions to be welded have been intermingled) without auguring a significant amount of the materials out of the conjoined region.

It should be noted that a friction-stir welding tool suitable for joining tubes and tube plates was disclosed by G. Wimmer in "Method for Joining Tube Plates and Tubes as Well as Friction Tool to Carry Out the Method," US Patent Application 2009/0159643, published on Jun. 25, 2009, which is incorporated by reference herein. The tool and method disclosed by Wimmer, however, does not provide an anvil for supporting the tube wall during friction-stir welding. Further, the shoulder and pin of the tool disclosed by Wimmer does not have independent motion along its longitudinal axis. As a result, in contrast to tubes welded in accordance with the present invention, a tube welded in accordance with the disclosure of Wimmer is more likely to exhibit tube side wall damage in the form of surface structure and voids. Further, withdrawal of a weld-tool such as that disclosed by Wimmer leaves a hole in the material welded due to augering of the material from the welded region as the tool is removed. These drawbacks can potentially lead to leakage between working and secondary fluids, increased flow back pressure, increased corrosion, and increased bio-fouling during operation.

Figure 8:
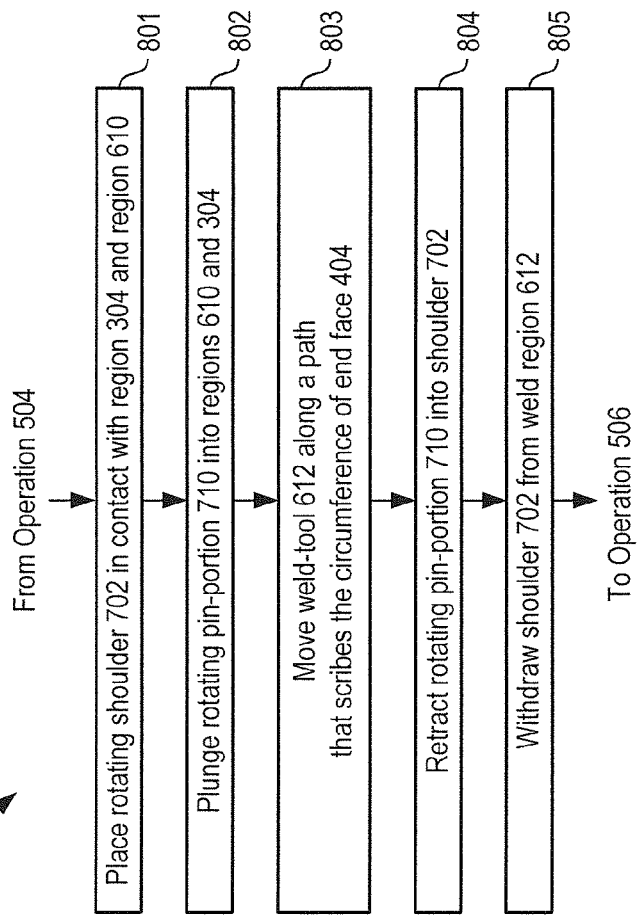
FIG. 8 depicts sub-operations suitable for use in operation 505.

FIG. 8 depicts sub-operations suitable for use in operation 505. Operation 505 begins with sub-operation 801, wherein the contact surface 704 of shoulder 702 is forced into contact with and rotated against region 610 of tube wall 402 and region 304. Region 610 represents the portion of tube wall 402 being welded at a given time. The heat induced by the rotation of shoulder 702 against regions 610 and 304 softens the material in these regions. FIG. 6D depicts a cross-section view of region 302 while shoulder 702 is positioned against end face 404 and region 304 during sub-operation 801.

At sub-operation 802, pin 706 is extended through shoulder 702 to plunge rotating pin-portion 710 into the softened material of regions 610 and 304. Pin-portion 710 comprises features, such as threads, to facilitate mass transport of the material of regions 610 and 304 along a direction aligned with axis 620.

At sub-operation 803, weld-tool 700 is moved along a path that traces the circumference of end face 404. Since shoulder 702 has a larger diameter than pin 706, shoulder 702 leads pin 706 along this path and region 610 travels around the circumference of end face 404 in advance of pin-portion 710 as well. As weld-tool 700 scribes the complete circumference of end face 404, a continuous weld region 612 is formed between tube wall 402 and region 304. Weld region 612, therefore, forms a substantially hermetic seal between tube 216 and tube plate 220.

FIG. 6E depicts a cross-section view of region 302 wherein weld-tool 700 is at its half-way point around the circumference of tube 216.

It should be noted that, in some embodiments, weld region 612 extends slightly into plug 608. It should also be noted that while supporting tube wall 402 during friction-stir welding, plug 608 also blocks weld material from travelling down tube during the welding operation.

At sub-operation 804, pin 706 is retracted into shoulder 702 thereby removing pin-portion 710 from weld region 612.

At sub-operation 805, weld-tool 700 is retracted away from tube plate 220, thereby withdrawing shoulder 702 from weld region 612.

Method 500 comprises operations directed toward the use of a weld-tool having a pin and shoulder that are independently movable along their mutual longitudinal axis. It should be noted, however, that some embodiments of the present invention utilize a plug that is separate from the weld-tool itself, and that such embodiments are also amenable to the use of a weld-tool having a shoulder and pin that are not independently movable along their mutual longitudinal axis (e.g., a single-piece weld-tool). This is due to the fact that, in embodiments of the present invention that employ a plug that is separate from the weld-tool itself, the plug remains within the tube while the weld-tool is retracted from the weld-region at the completion of the weld. As a result, the plug continues to protect the interior of the tube during and after the welding process, without regard to the relative motions of the shoulder and pin of the weld tool.

One skilled in the art will recognize, however, after reading this specification, that it would be preferable to remove a single-piece weld-tool (or equivalents) from the tube plate after it has been moved away from the immediate area of the tube (i.e., region 304)—for example, to a scrap area to be removed from the tube plate after all of the tubes are joined to the tube plate or to a region of the tube plate 220 outside of any region 304 where the integrity of the tube/tube plate weld would not be degraded by the permanent presence of a pin tool void on the surface 602.

FIG. 6F depicts a cross-sectional view of region 302 after completing of weld region 612. Typically, during friction-stir welding of tube 216 and tube plate 220, weld region 612 projects some distance above surface 602'. During operation of heat exchanger 110, voids associated with these surface features can trap contaminants on tube plate 220 and lead to accelerated corrosion, bio-fouling, as well as other undesirable effects.

In addition, in some cases, weld region 612 extends some distance into plug 608. As a result, removal of plug 608 at the completion of the friction-stir welding process is difficult.

It should be noted that operations 501 through 505 are performed for each of the plurality of tubes 216 to be joined to tube plate 220. Upon completion of operation 505 for each tube, tubes 216 and tube plate 220 collectively define tubesheet 222. In some embodiments, the path scribed in sub-operation 803 includes the circumferences of more than one of the plurality of tubes 216 prior to proceeding to sub-operation 804. In some embodiments, the path scribed in sub-operation 803 includes the circumferences of all of the tubes in the plurality of tubes 216 prior to proceeding to sub-operation 804. By including more than one circumference in this path, manufacturing time of the welding process can be reduced.

At operation 506, front face 614 of tube sheet 222 is planarized using conventional machining techniques (e.g. fly cutting front face 614). As a result, the surface features of weld region 612 are removed from front face 614. Further, sufficient material is removed from each of surface 602', weld region 612, and plug 608 to enable easy removal of plug 608 from tube 216.

FIG. 6G depicts a cross-sectional view of region 302 after planarization of front face 614. After operation 506, surface 602' has been removed and tubesheet 222 has front surface 602" as shown. Further, the portions of weld region 612 previously joining plug 408 are removed so that plug 408 is readily removed from tube 216 without requiring the plug to be drilled or reamed.

At operation 507, the support of tube wall 404 is removed by removing plug 408. In some embodiments, plug 408 is removed by pressuring the interior of tube 216 to force the plug out. In some embodiments, plug 408 is removed by means of suction that pulls the plug out of the tube. In some embodiments, a mechanical element, such as a pushrod is used to push plugs 408 out of the holes.

FIG. 6H depicts a cross-sectional view of region 302 after removal of plug 408.

Figure 9:
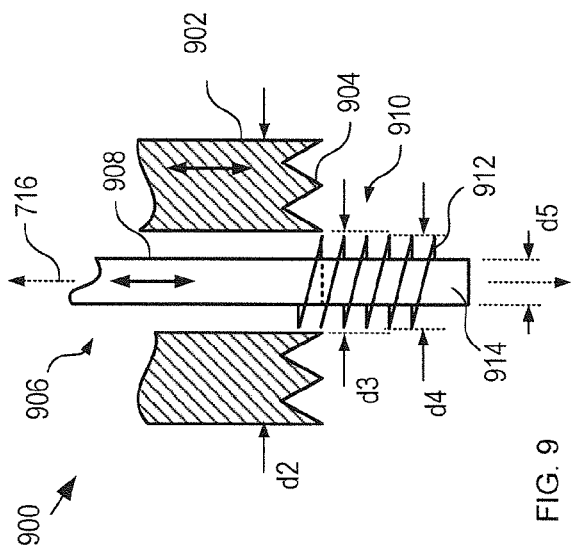
FIG. 9 depicts a cross-sectional view of a weld-tool in accordance with a first alternative embodiment of the present invention.

FIG. 9 depicts a cross-sectional view of a weld-tool in accordance with a first alternative embodiment of the present invention. Weld-tool 900 comprises shoulder 902 and pin 906. Each of shoulder 902 and pin 906 rotates about axis 716. Further, each of shoulder 902 and pin 906 is independently movable along axis 716.

Figure 10:
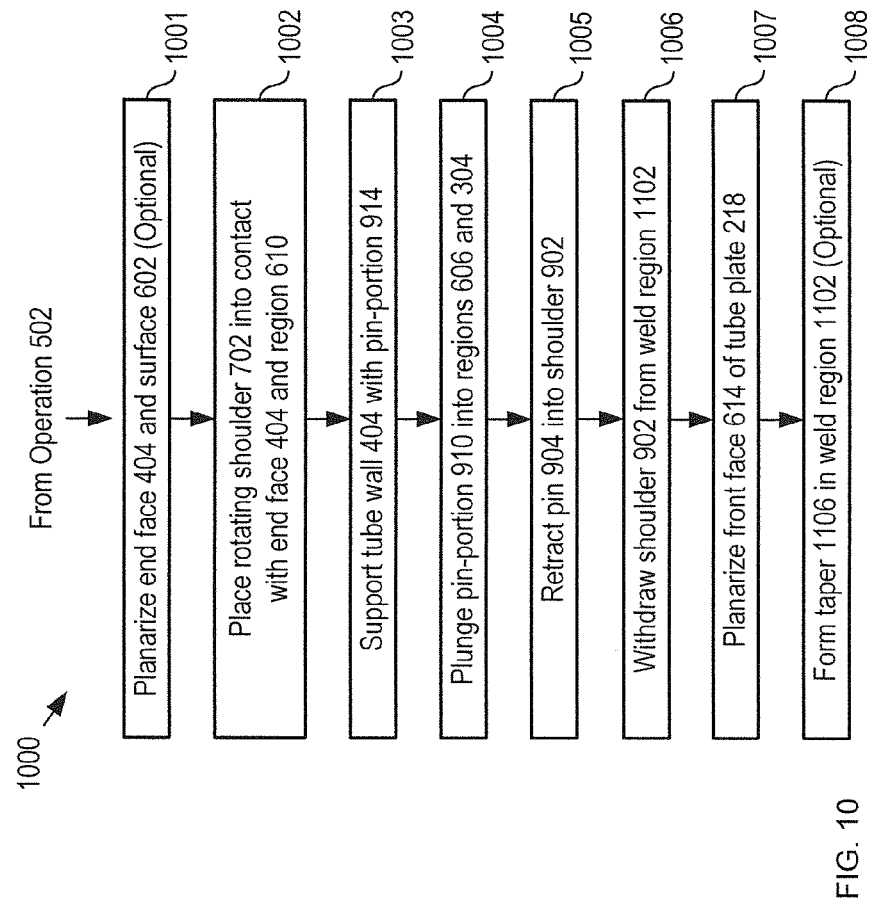
FIG. 10 depicts operations of a method for joining tube 216 and tube plate 220 in accordance with the first alternative embodiment of the present invention.

FIG. 10 depicts operations of a method for joining tube 216 and tube plate 220 in accordance with the first alternative embodiment of the present invention. Method 1000 begins after operation 502 of method 500 with optional operation 1001, wherein tube 216 and surface 602 are planarized. In some embodiments wherein tube 216 is inserted into hole 218 such that end face 404 is flush with surface 602, operation 1001 is not necessary.

FIGS. 11A-C depict a cross-section view of region 302 at different stages of method 1000.

At operation 1002, rotating shoulder 902 is forced into contact with region 304. As a result, region 304 and the entire portion 606 of tube 216 are heated into a softened state. FIG. 11A depicts a cross-section view of region 302 during operation 1002.

Shoulder 902 is analogous to shoulder 702 of weld-tool 700; however, shoulder 902 has diameter d2, which is substantially equal to the diameter of region 304. In some embodiments, d2 is only large enough to ensure a reliable weld to enable dense arrangements of tubes 216. The inner diameter, d3, of shoulder 902 is slightly larger than the outer diameter of portion 606 of tube 216. Shoulder 902 comprises features 904, which are analogous to features 704 of weld-tool 700.

At operation 1003, tube wall 402 is supported by insertion of pin-portion 914 into portion 606 of tube 216. FIG. 11B depicts a cross-section view of region 302 during operation 1003.

Pin 906 comprises pin-portions 908, 910, and 914. Pin-portion 908 is analogous to pin-portion 708 of weld-tool 700. Pin-portion 910 is analogous to pin-portion 710 of weld-tool 700; however, the diameter, d4, of pin-portion 910 is approximately equal to the outer diameter of portion 606 of tube 216.

Pin-portion 914 functions as an anvil for supporting tube wall 402 during friction-stir welding. Pin-portion 914 is analogous to plug 608, described above and with respect to FIG. 6C. Pin-portion 914 has diameter, d5, which is substantially equal to the inside diameter of portion 606 of tube 216, as described above and with respect to FIG. 6B.

At operation 1004, pin-portion 910 is plunged into the softened material of regions 606 and 304. Threads 912 intermingle the materials of tube wall 402 and region 304 forming weld region 1102. FIG. 11C depicts a cross-section view of region 302 during operation 1004.

At operation 1005, pin 906 is retracted back into shoulder 902.

At operation 1006, shoulder 902 is withdrawn from contact with weld region 1102. Upon completion of operation 1006 for each tube, tubes 216, weld regions 1102, and tube plate 220 collectively define tubesheet 1104 having front face 1106. FIG. 11D depicts a cross-section view of region 302 after operation 1006.

Figure 11E:
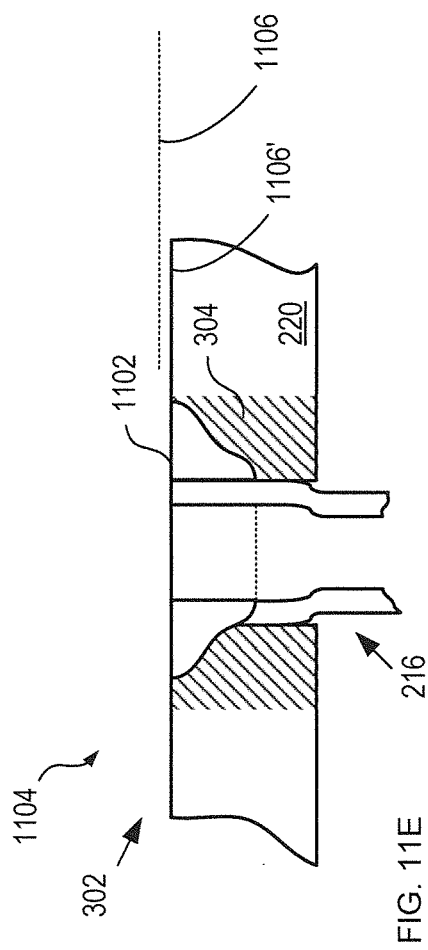

At operation 1007, front face 1106 of tube sheet 1104 is planarized using conventional machining techniques (e.g. fly cutting front face 1106). As a result, the surface features of weld region 1102 and a portion of front face 1106 are removed to define front face 1106'. FIG. 11E depicts a cross-section view of region 302 after operation 1007.

Figure 11F:
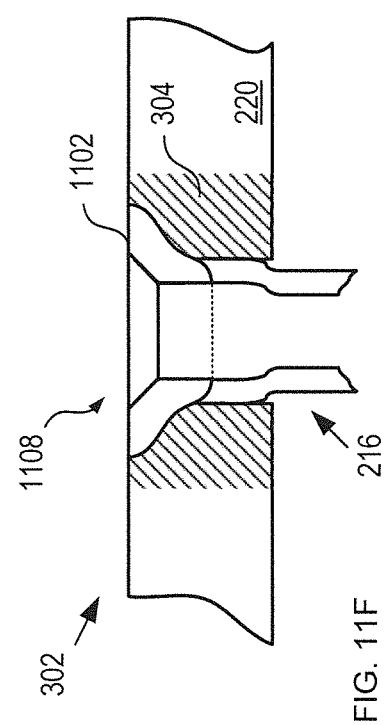

At optional operation 1008, weld region 1102 is tapered to create flared region 1008. Flared region 1008 is a beveled area formed by means of a countersink tool. In some embodiments, flared region 1008 is a curved surface. Flared region 1008 reduces back pressure associated with the flow of fluid into and out of tubes 216. FIG. 11F depicts a cross-sectional view of region 302 after operation 1008.

It should be noted that method 1000 and weld tool 900 obviate the need to provide and insert individual plugs 608 in each of tubes 216. In addition, pin-portion 914 automatically centers weld-tool 900 in each tube 216. Further, weld-tool 900 forms a weld region around the entire circumference of tube 216 at one time. This obviates the need to scribe a path around the end face of each tube to be welded.

Figure 12:
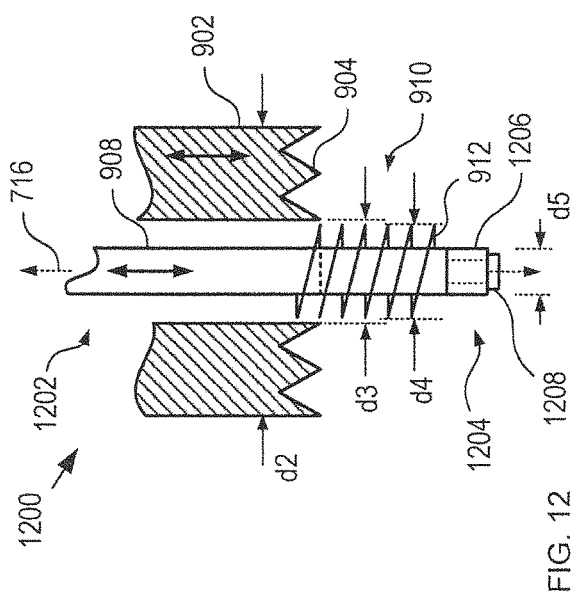
FIG. 12 depicts a cross-sectional view of a weld-tool in accordance with a second alternative embodiment of the present invention.

FIG. 12 depicts a cross-sectional view of a weld-tool in accordance with a second alternative embodiment of the present invention. Weld-tool 1200 comprises shoulder 902 and pin 1202. Each of shoulder 902 and pin 1202 rotate about axis 716. Further, each of should 902 and pin 1202 is independently movable along axis 716.

Pin 1202 comprises pin-portions 908, 910, and 1204. Pin-portion 1204 comprises bearing 1206, which has an outer diameter substantially equal to the inner diameter of portion 606 of tube 216. Bearing 1206 is held on to pin 1202 by means of retainer nut 1208.

Weld-tool 1200 is analogous to weld-tool 900 and method 1000 is also suitable for forming a friction-stir weld using weld-tool 1200. By virtue of bearing 1206, however, weld-tool 1200 comprises a non-rotating anvil (i.e. pin-portion 1204).

Bearing 1206 centers pin 1202 with respect to tube 216. The outer surface of bearing 1206 contacts the inner wall of portion 606 and does not rotate against this surface during friction-stir welding. As a result, weld-tool 1200 enables friction-stir welding of tubes and tube plates without causing significant damage to the interior of the tubes. Such damage can lead to reduced mechanical strength, voids that can trap particulate or other contaminants that can cause fouling and/or increased corrosion, an increase in back pressure that resists the flow of working fluid through the tube, among other issues.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for joining a plate and a tube, the method comprising:
   inserting the tube into a hole, wherein the plate comprises the hole and a first region that surrounds the hole, and wherein the tube comprises a tube wall and an end face;
   immobilizing the tube with respect to the hole;
   providing a weld-tool that comprises (1) a shoulder that rotates about a first axis and (2) a pin having a first pin-portion and a second pin-portion, wherein the first pin-portion rotates about the first axis, and wherein the second pin-portion does not rotate about the first axis;

placing the shoulder in physical contact with each of the end face and the first region such that the shoulder rotates against each of the end face and the first region, wherein the physical contact between the shoulder and the end face softens a first portion of the tube and the first region;

inserting the pin into the tube; and intermingling material of the first portion of the tube and material of the first region.

2. The method of claim 1 further comprising planarizing a first surface of the plate, the end face, and the intermingled material of the tube wall and the first region.

3. The method of claim 1 and further wherein the first pin portion:
   (a) comprises a feature that facilitates mass transport between the tube wall and the first region; and
   (b) has a diameter that is substantially equal to the outer diameter of the tube.

4. The method of claim 3 wherein the feature comprises a threaded region.

5. The method of claim 1 and further wherein the second pin portion has a diameter that is substantially equal to an inner diameter of the tube.

6. The method of claim 1 further comprising providing the weld-tool such that the shoulder and pin are independently movable along the first axis.

7. The method of claim 1 wherein the tube is immobilized with respect to the hole by putting a first portion of the tube into substantially uniform physical contact with the second portion of the plate, and wherein the physical contact substantially immobilizes the tube with respect to the plate.

8. The method of claim 1 wherein after the shoulder softens the first portion of the tube and the first region, the method further comprises:
   (a) disengaging the shoulder from the softened first portion of the tube and the first region; and then
   (b) withdrawing the pin from the tube.

9. The method of claim 1 wherein the material of the first portion of the tube and material of the first region are the same material.

10. A method for joining a plate and a tube, the method comprising:

inserting the tube into a hole, wherein the plate comprises the hole and a first region that surrounds the hole, and wherein the tube comprises a tube wall and an end face;

immobilizing the tube with respect to the hole;

physically contacting each of the end face and the first region with a rotating shoulder of a weld tool; and inserting a first portion of a pin and a second portion of a pin of the weld-tool into the tube, wherein the first portion of the pin rotates and the second portion of the pin does not rotate.

11. The method of claim 10 further comprising planarizing a first surface of the plate, the end face, and intermingled material of the tube wall and the first region that results from rotating contact with the weld-tool.

12. The method of claim 10 and further wherein the first portion of the pin comprises a feature that facilitates mass transport between the tube wall and the first region.

13. The method of claim 12 wherein the feature comprises a threaded region.

14. The method of claim 10 and further wherein the first portion of the pin has a diameter that is substantially equal to the outer diameter of the tube.

15. The method of claim 10 and further wherein the second portion of the pin has a diameter that is substantially equal to an inner diameter of the tube.

16. The method of claim 10 wherein the second portion of the pin comprises a bearing.

17. The method of claim 10 and further wherein the shoulder and pin are independently movable along a first axis.

18. The method of claim 10 wherein the tube is immobilized with respect to the hole by putting a first portion of the tube into substantially uniform physical contact with the second portion of the plate, and wherein the physical contact substantially immobilizes the tube with respect to the plate.

19. The method of claim 10 wherein the material of the first portion of the tube and material of the first region are the same material.

* * * * *